United States Patent [19]
Lionetto et al.

[11] Patent Number: 6,118,675
[45] Date of Patent: Sep. 12, 2000

[54] METHOD AND APPARATUS FOR CONTROLLING POWER TRANSFER IN A FLYBACK CONVERTER BY MODULATING THE POWER SWITCH OFF TIME DURING TRANSIENT CONDITIONS

[75] Inventors: Antonio Lionetto, Catania; Luigi Occhipinti, Ragusa; Sergio Tommaso Spampinato; Riccardo Caponetto, both of Catania, all of Italy

[73] Assignee: STMicroelectronics S.r.l., Agrate Brianza, Italy

[21] Appl. No.: 09/413,996

[22] Filed: Oct. 7, 1999

[30] Foreign Application Priority Data

Oct. 7, 1998 [EP] European Pat. Off. .............. 98830591

[51] Int. Cl.[7] .................................................. H02M 3/335
[52] U.S. Cl. ............................................. 363/21; 363/49
[58] Field of Search .................................. 323/21, 97, 41, 323/49

[56] References Cited

U.S. PATENT DOCUMENTS

| | | | |
|---|---|---|---|
| 4,984,145 | 1/1991 | Dangschat et al. .................... | 363/19 |
| 5,657,215 | 8/1997 | Faulk ....................................... | 363/41 |
| 5,748,461 | 5/1998 | Preller ..................................... | 363/97 |

*Primary Examiner*—Shawn Riley
*Attorney, Agent, or Firm*—Theodore E. Galanthay; Allen, Dyer, Doppelt, Milbrath & Gilchrist, P.A.

[57] ABSTRACT

A method of controlling a flyback DC-DC converter includes using a primary control loop to monitor an auxiliary winding of a transformer for determining the amount of energy being transferred to a load. The voltage in the auxiliary winding is induced by current flowing in the secondary winding of the transformer. The primary control loop disables and enables the turning on of a power switch for driving the primary winding of the transformer, and detects the zero-crossing. The duration that the power switch is turned on is established by a secondary control loop using the output voltage for turning off the power switch for a new off phase. The flyback DC-DC converter further includes a fixed frequency oscillator having a frequency lower than the self-oscillating frequency of the converter. The power transferred from the primary circuit to the secondary circuit of the flyback transformer is controlled by introducing a delay on the turn-on instant of the power switch. This is with respect to a turn-on command generated during a self-oscillating functioning phase regardless of the mode of control of the converter. The turn-on command is based upon a zero crossing, a fixed frequency functioning phase, a rising edge of the signal generated by the oscillator, and as a function of the input variables of the primary and secondary control loops.

31 Claims, 7 Drawing Sheets

METHOD AND APPARATUS FOR CONTROLLING POWER TRANSFER IN A FLYBACK CONVERTER BY MODULATING THE POWER SWITCH OFF TIME DURING TRANSIENT CONDITIONS

FIELD OF THE INVENTION

The invention relates to voltage converters, and, more particularly, to a flyback DC-DC converter.

BACKGROUND OF THE INVENTION

Research and development efforts on integrated power supplies that include DC-DC converters are improving and making them more adaptable to different applications. These power supplies are high performance in terms of response to load transients and provide a broad stability range. In addition, these power supplies provide excellent static and dynamic characteristics for reducing electromagnetic radiation. It is desirable to reduce or minimize the number of circuit components needed for these power supplies, particularly when included in VCRs, TVs, receivers, satellite decoders and other similar consumer products. Consequently, the cost of these items can be reduced.

In recent years, many specially designed devices have been produced and marketed to serve these economically important applications. Leading manufacturers of electronic components, such as STMicroelectronics, the assignee of the present invention, market a wide range of monolithic and hybrid devices designed to handle output powers in a range of about 30 to 300 W.

Strict requirements, such as performance specifications, often require a customized product to simplify layouts and to reduce the number of components necessary to form the power supply. A customized product also reduces production costs. The configuration most frequently used in a broad range of consumer products is a flyback self-oscillating power supply (SOPS). A typical flyback scheme is shown in FIG. 1. This basic scheme of a DC-DC converter circuit provides control for transferring power having a switching frequency of about 100 kHz. A relatively small flyback transformer is used for providing high efficiency in transferring power from the primary circuit to the secondary or output circuit.

Generally, a variable frequency control is implemented in a SOPS converter. The conduction phase ($T_{ON}$) of the power switch that drives the primary winding is limited, as in a PWM system, by the maximum current and by the output voltage error. The primary winding stores the phase of energy in the flyback transformer. The duration of the nonconducting phase ($T_{OFF}$) is determined by the applied load. The non-conduction phase is the stored energy that is transferred to the load via the output of the power supply. In support of the variable frequency control, the zero-crossing of the voltage induced by the current flowing in the secondary winding on a third or auxiliary winding is detected. Consequently, a logic signal for acknowledging the occurrence of such a zero-crossing turns on the power switch and starts a new conduction phase.

FIG. 2 shows the scheme of a flyback SOPS produced and marketed by Sanken, in which the auxiliary winding AUX is used to power the control circuits of the converter. By way of a delay network Tdelay, switching of the comparator C2 is synchronized with a null voltage on the current terminals of the power switch to turn on the power switch. The power switch is turned on in a quasi-resonant condition to avoid a hard switching mode of operation of the converter. The delay network is commonly formed with external discrete components.

The SOPS control, intrinsically a variable frequency type of control, forces the flyback converter to function close to the limit between a discontinuous mode and a continuous mode. The discontinuous mode is the zeroing of the current in the primary during an off phase. In the primary winding, a current continues to flow during an off phase of the power switch. Zeroing of the current in the primary during an off phase is the limit of the discontinuous mode.

The secondary control loop includes an output voltage error amplifier ERROR AMPLIFIER, whose output is photocoupled via a photodiode and a phototransistor to the inputs of the comparators COMP1 and COMP2. The control loop also includes the RC OSC network and the OSC circuit which intervenes to control variations of the output voltage Vout. Variations of the output voltage Vout occurs as a function of the transfer of energy stored in the flyback transformer to the load. Therefore, the control loop is unable to handle the start-up phase, which is the charging transient of the capacitance coupled to the converter output.

This inability is commonly overcome by implementing a primary control loop by way of the comparator COMP1, the circuit ENABLING CIRCUITS and the logic AND gate. A fixed frequency oscillator OSC is used by the primary control loop to turn on the power switch Pω with the rising edge of a fixed frequency clock signal provided by the OSC oscillator. This permits the start-up of the flyback converter until it reaches an output voltage sufficiently high to cause a proper self-oscillating mode of operation.

During the start-up phase, the OSC oscillator imposes a fixed duration off phase ($T_{OFF}$) according to a Pulse Ratio Control (PRC) mode of operation. Commonly, the OSC oscillator frequency is set by the RCOSC network to a value lower than the self-oscillating frequency of the flyback converter during its steady state functioning. The RCOSC network is made of external components. This ensures, at a steady state, a discontinuous mode of a self-oscillating converter (SOPS) which is intrinsically a very controllable mode of operation.

Normally, in a SOPS system, when the load applied to the output decreases, the switching frequency increases and this increments the losses due to switching of the power switch. Moreover, the unavoidable delays of the secondary control loop during the self-oscillating steady state functioning of the SOPS and the turn-off times typical of DMOS transistors dictate a minimum turn-on time ($T_{ON}$) of the converter. DMOS transistors are commonly used as power switches. Therefore, a certain minimum quantity of energy is stored in the transformer during each turn-on phase. This energy is completely transferred to the load. If the load absorbs an amount of energy lower than the minimum, the output filter capacitor overcharges and, therefore, the output voltage Vout increases.

In these circumstances, the control system may only intervene by turning off the converter. This is done by disabling turning on of the Pω switch via dedicated ENABLING CIRCUITS until the Vout drops below a certain threshold. This determines a burst mode of functioning, during which the SOPS converter functions by alternating periods of normal functioning with periods in which the switch is off.

Due to inevitable delays and the turn-off time of the power transistor, SOPS are not suitable to supply relatively small loads and/or for prolonged stand-by conditions. For these applications, a control system capable of limiting the power transferred to the output in a more effective way, such as, for example, a fixed frequency control, is commonly preferred.

Normally, when the load is reduced to stand-by conditions, a fixed frequency mode of control is enabled to facilitate the control and reduce losses.

The consequent decrease of the energy transferred to the output, and the limitation of the overshoot of the output voltage may reestablish the conditions for a transition to a variable frequency SOPS control mode which may cause a new overshoot of the output voltage. The converter may then oscillate between two modes of control—the variable frequency SOPS control and the fixed frequency control. The fixed frequency is at the frequency of the start-up and recovery oscillator.

Under these conditions, the current supplied by the error amplifier of the output voltage, and consequently, the current that flows in the power switch is a waveform that has a sequence of highs and lows. A similar behavior may be observed when the load of the converter is subject to an abrupt step-wise drop. Even in this case, the abrupt discontinuity of the load level induces an overshoot followed by a sinusoidal decay pattern of the current profiles of the error amplifier and the power switch. These behaviors, as well as a burst mode of operation, cause inefficiencies and a significant increase in the electromagnetic noise produced by the converter.

SUMMARY OF THE INVENTION

A solution to the above noted drawbacks and limitations of known SOPS systems has now been found. The present invention prevents a burst mode of operation of the converter. This is accomplished while attenuating the sinusoidal decay of the currents following an abrupt reduction in the load. In addition, repeated transitions from a self-oscillating mode to a fixed frequency mode of operation of the converter are avoided.

This important result is obtained, according to the present invention, by controlling the power transferred through the flyback transformer. The control is provided by modulating the duration of the off phase of the power switch as a function of a combination of current operating parameters to maintain the converter in a SOPS functioning mode until reaching limit output voltage conditions. These conditions determine the transition from a self-oscillating mode to a fixed oscillator frequency mode to prevent an intermittent or burst mode functioning of the converter. The voltage overshoot and the consequent decay transients are also limited upon transition from a SOPS control to a fixed frequency control and/or an abrupt reduction in the load (standby).

According to a preferred embodiment of the invention, the modulation of the duration of the off phase of the power switch while substantially preserving a SOPS functioning mode of the converter is implemented by adding a circuit that modulates the off interval. The circuit is coupled between the output of the bistable control circuit and the driver stage of the power transistor of the converter.

A modulation of the amount of energy transferred to the output forces the converter, during control transients and its steady state functioning, to operate in a discontinuous mode as compared to a limit condition of the self-oscillating mode. This introduces an effective modulation of the gain of the converter as a function of the applied load. This is done by controlling the off interval, while leaving the converter functioning in a SOPS mode, so that it functions in a PRC mode. The off interval is determined by input parameter signals of the control system of the converter.

A modulation of the energy transfer stabilizes the converter even under low load conditions. This practically eliminates the burst mode and limits the overshoot at transitions between the self-oscillating mode and the fixed frequency mode. The discontinuity represented by this transition between the two functioning modes, i.e., self-oscillating and fixed frequency modes, is more efficiently handled by a modulation that maintains a constant output voltage. Moreover, by acting directly upon the energy transfer and limiting the overshoots, a notable increase in the response time of the converter response is observed.

DETAILED DESCRIPTION OF THE PREFERRED EMBODIMENTS

Figure 1:
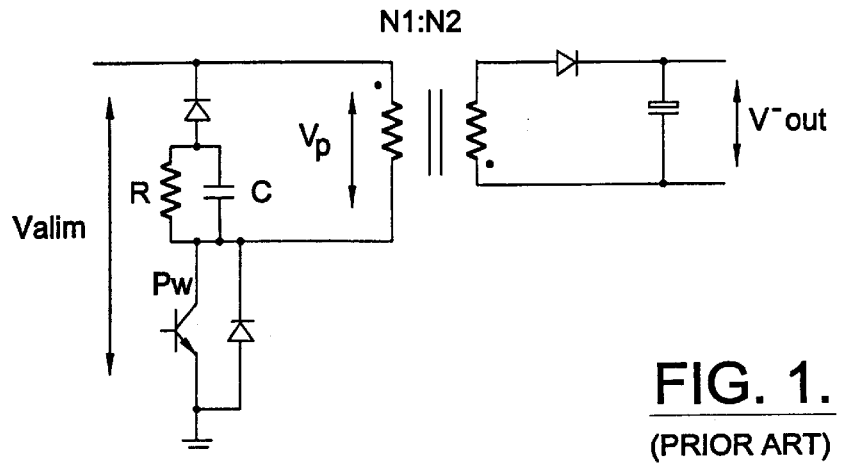
FIG. 1 is a basic diagram of a flyback DC-DC converter according to the prior art.
Figure 2:
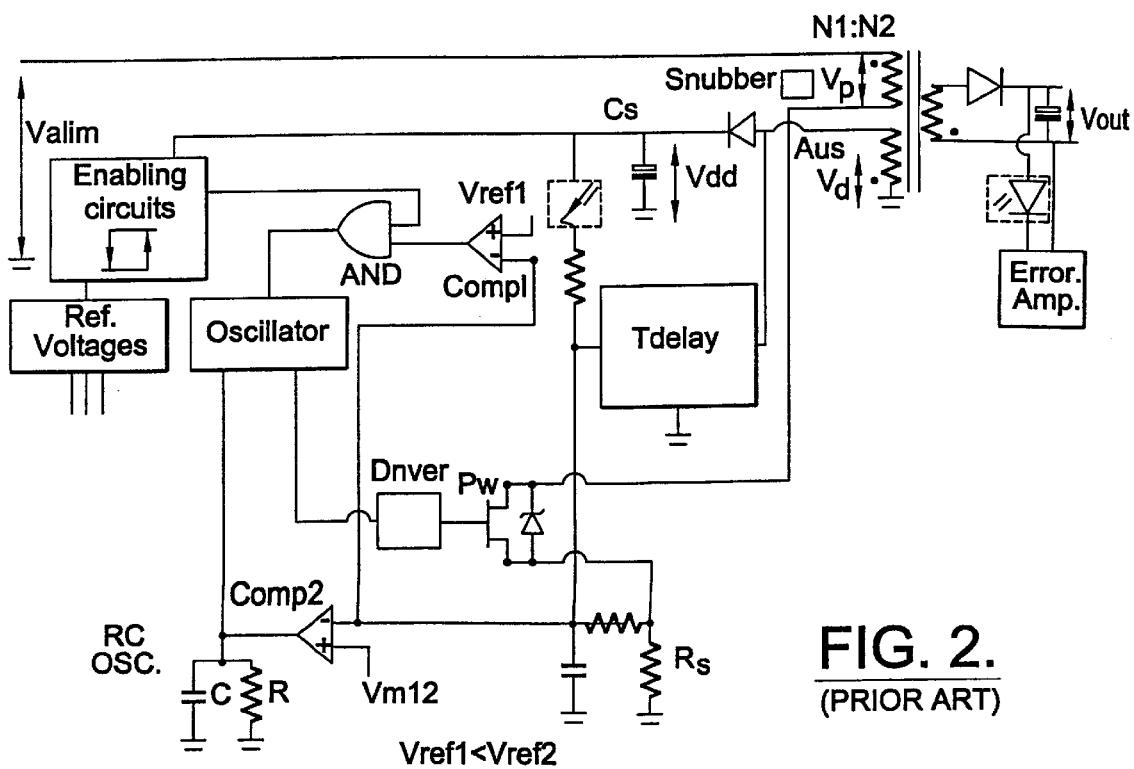
FIG. 2 is a detailed diagram of a flyback SOPS according to the prior art.
Figure 3:
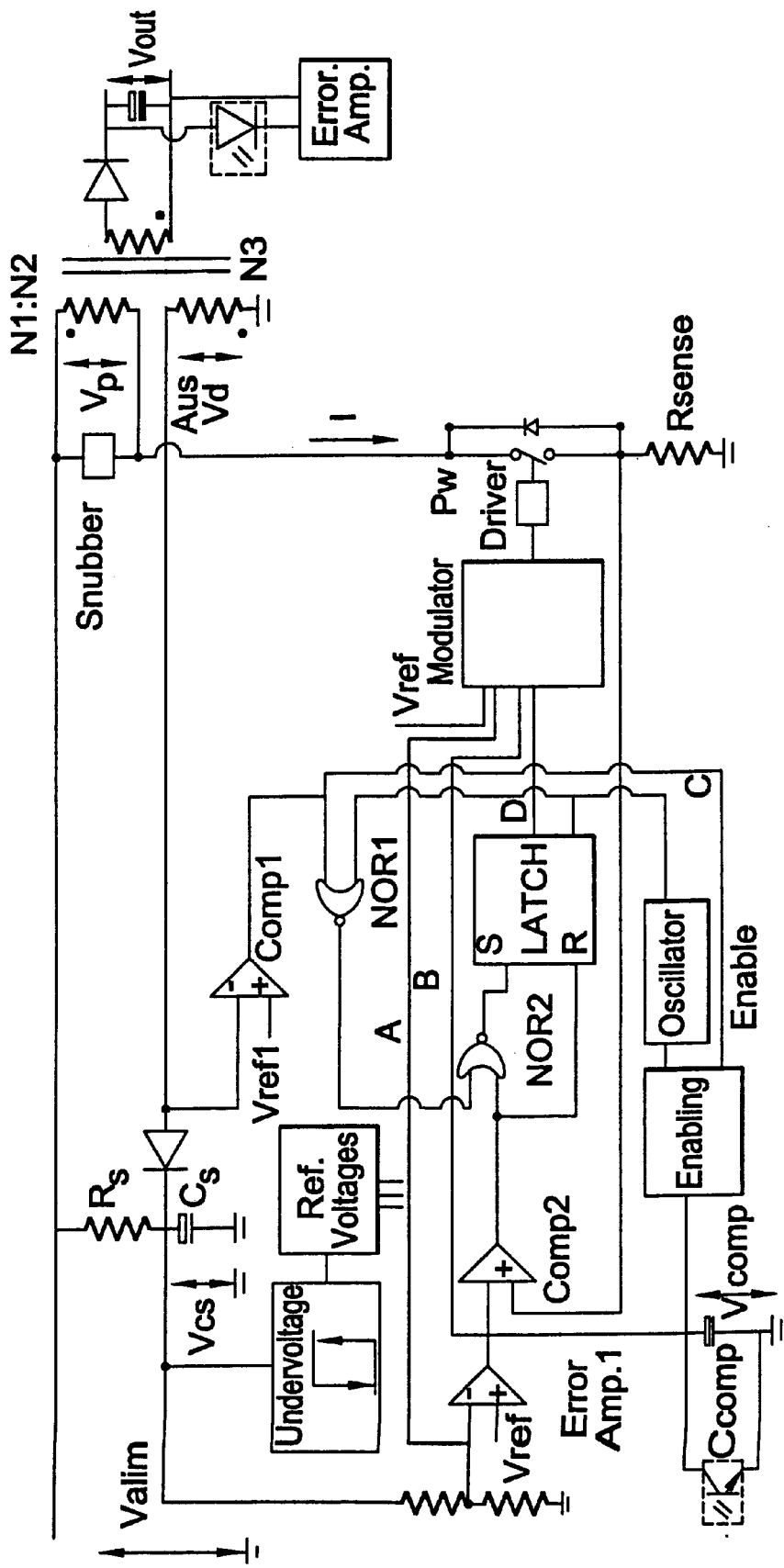
FIG. 3 is a diagram of a flyback SOPS converter according to the present invention.

The embodiment shown in FIG. 3 is one among possible forms of the present invention. It relates to a flyback converter that functions in two modes. A first mode of the converter operates at a fixed frequency, which is normally a low value around 16 to 20 kHz. The first is automatically commanded by the control circuit when a relatively low output power is required, such as, for example, during a stand-by condition of TV sets or VCRs. A second mode is a self-oscillating SOPS mode when the converter is operating under nominal power conditions. This functioning mode is also automatically commanded by the control circuit.

The second mode does not represent the only condition in which the invention may be advantageously implemented by modulating the duty cycle. The invention also remains effective during a phase of operation at a switching frequency between 100 and 200 kHz for reaching the maximum power level transferred to the load.

For the architecture shown in FIG. 3, the start-up and the recovery phases are managed by the circuit UNDERVOLTAGE, which is similar to known architectures. This circuit disables the voltage sources of the circuit REF. VOLTAGES until reaching a positive threshold Vcs (H). It is possible to charge the supply capacitor Cs with a low current which may be supplied, as shown in FIG. 3, through a resistor Rs having adequate value and dissipation characteristics. Otherwise, an initial charging of capacitor Cs may be performed using an integrated network.

Once the threshold Vcs(H) is reached, the UNDERVOLTAGE circuit enables with a certain hysteresis the control circuits of the converter. This discharges the capacitor Cs. If the voltage on the capacitor Cs terminals drops below a positive threshold Vcs(L), e.g., lower than Vcs(H), the UNDERVOLTAGE circuit will again disable the control circuitry. This allows recharging of the capacitor Cs. The electric charge stored in the capacitors Cs is sufficient to ensure the completion of several switching cycles of the converter and, therefore, an energy transfer to the output and to the auxiliary circuits.

Under steady state conditions, the voltage Vcs is kept higher than the Vcs(L) threshold by the current delivered by the auxiliary winding AUS during an OFF phase of the power switch. This is represented in FIG. 3 by a switch driven by the stage DRIVER. The output voltage Vout is controlled by two different control loops; a primary control loop and a secondary control loop.

The primary control loop controls the Vcs voltage of the control circuitry. Control is implemented using a voltage divider and an error amplifier ERROR AMP1 having its inverting input (−) coupled to a tap of the voltage divider. The Vcs voltage is tied to the output voltage Vout by the turn ratio N2:N3 of the transformer. The Vcs voltage is thus dependent on the characteristics of the transformer. The primary control loop does not have a high precision, but it has the advantage of not requiring external circuits.

The secondary control loop directly controls the output voltage Vout using an error amplifier ERROR AMP and an optical coupling to the VCOMP pin of the integrated control circuitry of the converter. The optical coupling ensures electrical isolation of the DC output voltage of the converter from the circuits linked to the VALIM supply voltage. The VALIM supply voltage is the rectified main voltage. This control provides for a high precision. For this reason, it is implemented in a large number of applications even though it requires the use of external components and has a higher cost.

For both modes, compensation of the control loop is provided by a CCOMP capacitor, generally connected externally. Through the comparator COMP2, the VCOMP voltage present on the compensation capacitor CCOMP controls the turn-off of the power switch according to the following formula:

$$VCOMP = RSENSE*1$$

This occurs by enabling a logic state 1 on the reset R of the bistable circuit LATCH. The logic gate NOR2 provides the reset signal R on the set signal S to avert a possible condition of indetermination.

In self-oscillating converters, the switching frequency of the converter is variable and depends on the applied load. The turn-off phase of the power switch (OFF phase) lasts until the energy stored in the transformer is completely transferred to the output circuit during the preceding conducting phase of the power switch (ON phase). Once this transfer is completed, the voltages at the terminals of the transformer tend to nullify themselves.

In known converters this characteristic is exploited to command the turning on of the power switch and the beginning of a new ON phase to store energy in the transformer. The energy stored in the primary winding inductance L1 of the transformer during the ON phase is given by:

$$\frac{L_1 I^2}{2}$$

The output power, which is the transferred energy, is given by:

$$\eta \times \frac{L_1 I^2 f}{2}$$

The variable η is the efficiency of the converter and $f$ is the switching frequency determined by the load conditions. The less the applied load, the higher is $f$ because both the ON phase and the OFF phase are short since the load requires less power.

The minimum switch-off and switch-on time intervals of the power switch are imposed by the characteristics of the device. This implies that even for very low loads or under stand-by conditions, a minimum storage of energy occurs in the transformer. This energy is eventually transferred to the load during the OFF phase. If the load absorbs less than this minimum energy transfer, the self-oscillating converter enters into a Burst Mode of operation. This mode of operation is characterized by few active switching cycles that causes an overshoot of the output voltage. This is followed by an interval of time during which switching-on of the power switch is disabled (VCOMP voltage made null) until the overshoot of the output voltage has decayed.

If the load to be absorbed requires a power lower than the power dissipated by the control circuitry of the converter, a functioning mode referred to as Bad Burst Mode may take place. In this mode, the turn-off interval of the power switch becomes so long that the capacitor Cs is discharged. The capacitor Cs continues to power the integrated circuitry to a voltage below the Vcs(L) threshold, thus imposing a new start-up and recovery phase.

The present invention automatically establishes a fixed frequency functioning mode for low level loads, and a self-oscillating functioning mode that substantially prevents either a Bad Burst Mode and a Burst Mode. An excess voltage condition at the output of the converter is fedback by the above described feedback loops. The feedback is the VCOMP voltage at a decreased level. Under a certain threshold, the ENABLING circuit activates the fixed frequency functioning mode according to the present invention.

During the initial start-up phase and/or a recovery phase of the device, the CCOMP capacitor is discharged and the voltage VCOMP on its terminals is approximately zero. This determines that the initial functioning mode of the converter is to be at a fixed frequency. During the fixed frequency functioning mode, the ENABLE signal is a logic level 0. This determines through the logic operator NOR1 the predominance of the signal generated by the circuit OSCILLATOR.

During the OFF phase when the power switch is open, the COMP2 output places a logic level 0 at the reset R input of the bistable circuit LATCH. This is done while the rising edge of the fixed frequency signal generated by the circuit OSCILLATOR inputs a logic level 1 to the set S input of the LATCH, which sets the output to a logic level 1. In this functioning mode, the logic level causes the closing of the power switch and the beginning of a successive ON phase. The power switch is closed through the MODULATOR circuit and the DRIVER circuit.

During a self-oscillating functioning mode, the ENABLING circuit inputs a logic level 1 for the ENABLE signal and disables the OSCILLATOR circuit which sets the output to a logic level 0. This determines the predominance of the signal output by the COMP1 comparator through the logic operator NOR1. At the instant the voltage on the transformer windings becomes zero, the output of the COMP1 circuit is set to a logic level 1. This determines, as during operation at a fixed frequency, the output of the bistable circuit LATCH to be a logic level 1. The voltage on the transformer windings becomes zero when completing the transfer of the energy stored in the transformer to the output during the preceding ON phase. Without the MODULATOR circuit, such a condition would cause the power switch to be turned on, even in this functioning mode.

In the preferred embodiment of the invention shown in FIG. 3, the MODULATOR circuit limits the overshoot of the output voltage as well as its effect. This is accomplished by speeding up the response of the converter to intervening load variations while permitting a correct and gradual transition between the two functioning modes.

Figure 4:
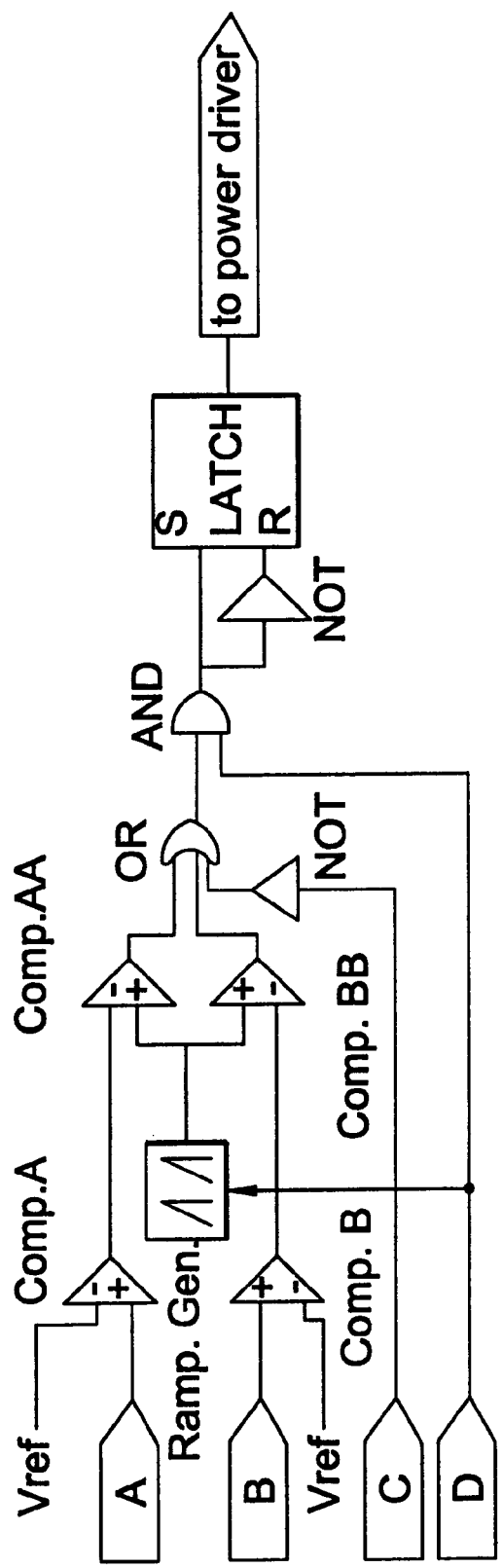
FIG. 4 is a detailed diagram of the modulating circuit in FIG. 3.
Figure 5A:
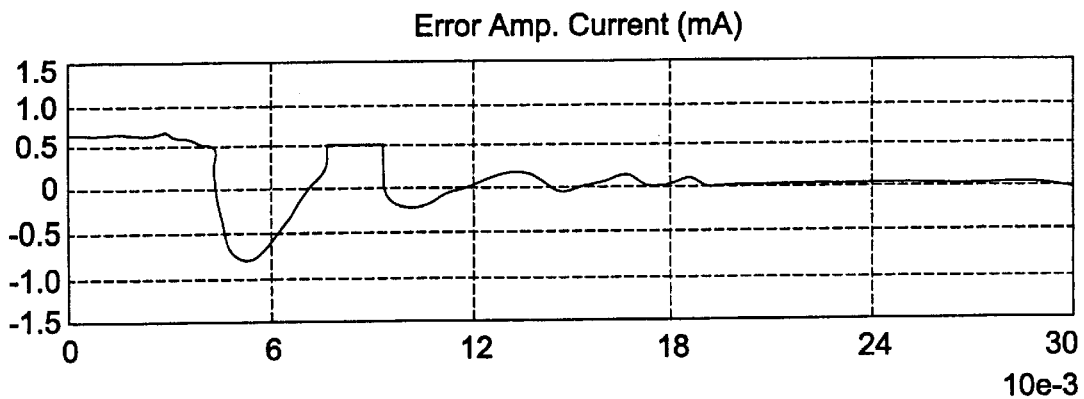
FIG. 5 is a graph of the significant signals in the converter of FIG. 3.
Figure 5B:
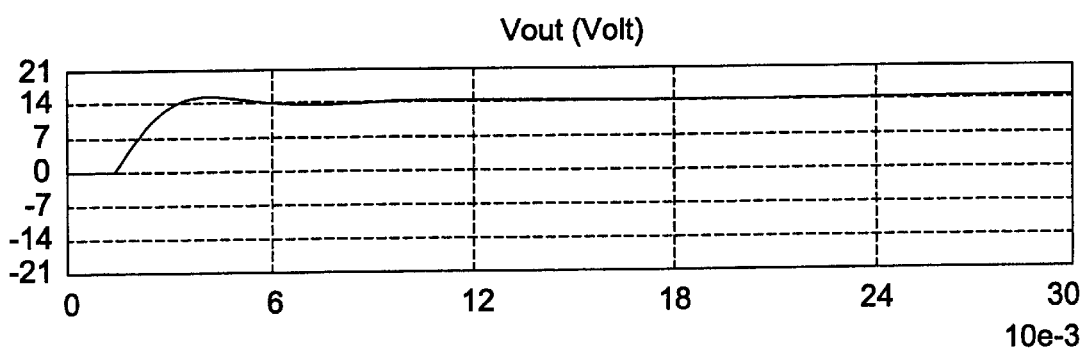
Figure 5C:
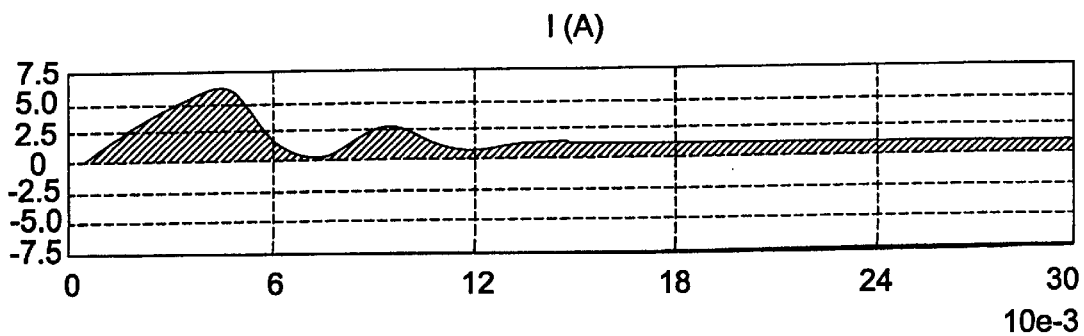

The MODULATOR circuit may have a functional architecture as shown in FIG. 4. Its intervention is caused by the signal A which represents the Vcs (primary loop variable), and by the signal B which represents the VCOMP (secondary loop variable). The other signals input to the MODULATOR circuit are the C signal and the D signal.

The C signal is the signal that was already defined ENABLE in relation to the diagram of FIG. 3. Its logic level 0 commands a fixed frequency functioning mode, and its logic level 1 commands a self-oscillating functioning mode. The D signal is the output of the bistable circuit LATCH of FIG. 3. Its logic level 0 causes the turning-off of the power switch, and its logic level 1 causes the immediate turning on of the power switch during a fixed frequency functioning mode. In a self-oscillating mode, the MODULATOR circuit introduces a delay for the switch-on signal (D=1) of the power switch. The delay has a magnitude that depends on the overvoltage condition of the output.

The two signals A and B are compared with respective references in the COMPA and COMPB circuits. The output of each of these two circuits is compared to a ramp signal synchronous with the D signal (power turn-on signal) in the COMPAA and COMPBB circuits, respectively. The logic block OR allows for enabling the MODULATOR circuit when the inverse of the signal C (obtained through the inverter) is at a logic level 0. That is, the ENABLE signal is at logic level 1. The logic block OR operates a modulation depending on the monitoring of more control variables (VCS and VCOMP).

The output of the AND gate combines the output of the OR gate with the power switch turn-on signal D. This drives the bistable circuit LATCH of FIG. 4 whose output controls the stage driver of the power switch. The set signal is predominant in the LATCH circuit. According to this invention, the modulation circuit MODULATOR may be advantageously introduced in power supplies with a duty cycle control.

The modulation circuit and related logics of the invention may be similarly used in control loops operating either in a voltage mode or in a current mode. Generally, a time modulation circuit will be functionally introduced upstream of the actuators, i.e., a driver stage, etc. When enabled, it will adequately delay the switching on of the power switch by an interval that is determined by the functioning condition. This is regardless of the type of control mode being currently used.

Should the load no longer absorb the entire energy transferred to the output in a SOPS system, the output voltage will increase causing the intervention of both the conventional control circuitry as well as the modulation circuit of the invention. This condition takes place in a start-up phase. In this way, the transfer of energy to the output is reduced by effectively lowering the gain of the converter circuit. This limits the overshoot of the output voltage. In contrast, the conventional control circuitry would lead to substantial overshoots because of nonnegligible response times.

This combination of effects of the conventional control system and of the auxiliary time modulation circuit stabilizes the output voltage and causes a gradual disabling of the modulation circuit of the invention. This allows maximum transfer of energy while limiting overshoots. The output voltage Vout is kept within a defined range because of the modulation circuit of the invention. The control circuit of the converter quickly stabilizes to the new steady state condition. This is done by coming out of an overshoot through a damped oscillation due to the output capacitance, and to the characteristics of the output voltage error amplifier. The initial overshoot that occurs with a traditional control circuit allows stabilization of the converter of the invention for relatively low level loads.

During stand-by conditions, that is, for load levels that cannot not be stably supplied in a self-oscillating mode, the converter automatically passes to the fixed frequency mode. Even in this situation, the converter may temporarily turn itself off because of the overshoot. The action of the modulator introduced according to the present invention stabilizes and keeps the output voltage within a small range during the entire transient.

According to the present invention, a modulation of the energy transfer is introduced only in a phase of regulation. Therefore, it acts on the transients making the converter overcome the noted drawbacks. This extends the stability range regardless of the functioning mode with which the system reaches a steady state. For the correct functioning of the modulation circuit, it is sufficient to exploit signals that are already used in a common control circuit of the converter without requiring additional external circuits and components. The modulating action is undertaken by controlling the $T_{OFF}$ time, which is added to the normal control of the time $T_{ON}$. This overcomes exceeding the limits imposed by the presence of switching delays in the common control loop.

The following are some of the important advantages of the invention. The modulation circuit may be easily introduced in the circuit architecture of a traditional control circuit and integrated with it. The control on the energy transfer acts on the transfer function depending on the load conditions. This compensates the negative effects of abrupt load variations without requiring the introduction of sensors of the current delivered to the load. The invention may be applied to regulators having different functioning modes and/or of different types. In particular, the architecture of the invention may be used to support the action of a FUZZY control replacing a traditional control circuit of the converter.

The limiting of the energy transfer operated by the modulator circuit of the invention takes place only during the transients This is done without effecting the maximum steady state transfer allowed by the type of converter and relative control. The discontinuity between the self-oscillating mode and the fixed frequency mode is substantially eliminated. This reduces the electromagnetic noises produced by the converter. The response speed of the converter is also enhanced.

There is an extension of the self-oscillating mode toward relatively lower levels of the load, thus substantially preventing the burst mode and the bad burst mode. The fixed frequency functioning at extremely low loads is stable. A combination of effects of the primary control loop and of the secondary control loop is advantageously implemented according to the invention. In feedforward, variables are referred to an auxiliary winding of the transformer. In feedback, variables are proportional to the output voltage.

Figure 6A:
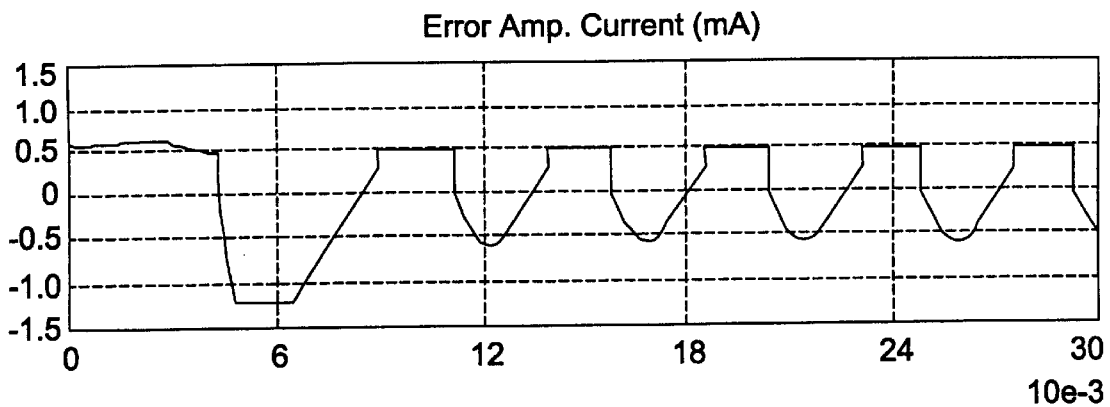
FIGS. 6, 7 and 8 are graphs of the significant signals, including the response to a step variation of the load converter shown in FIG. 3, with and without the modulating circuit of the invention.
Figure 6B:
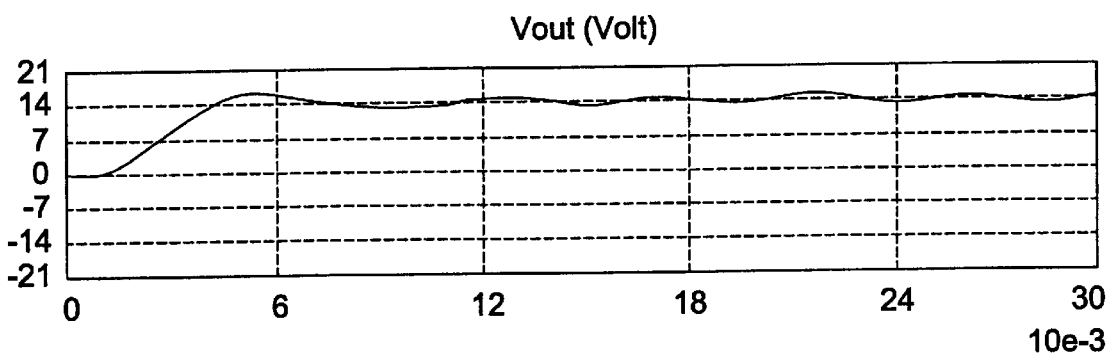
Figure 6C:
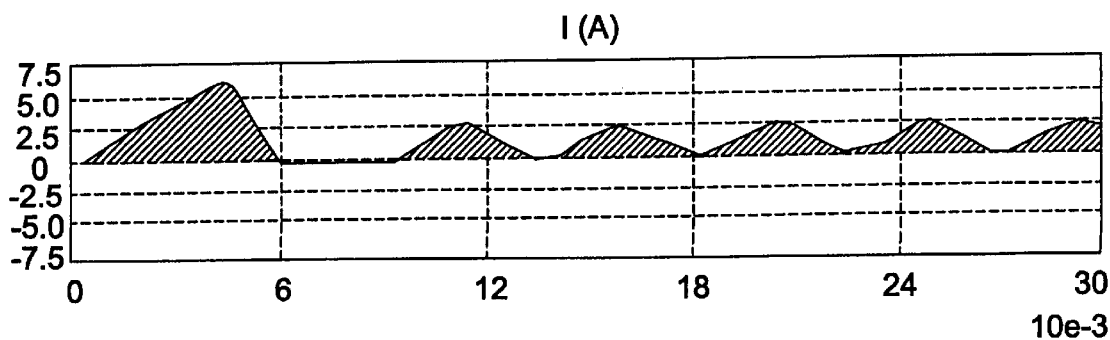
Figure 7A:
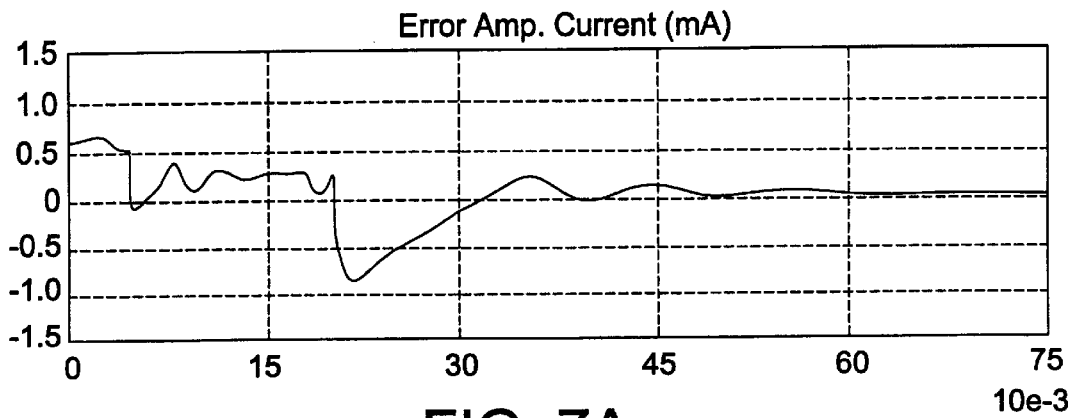
Figure 7B:
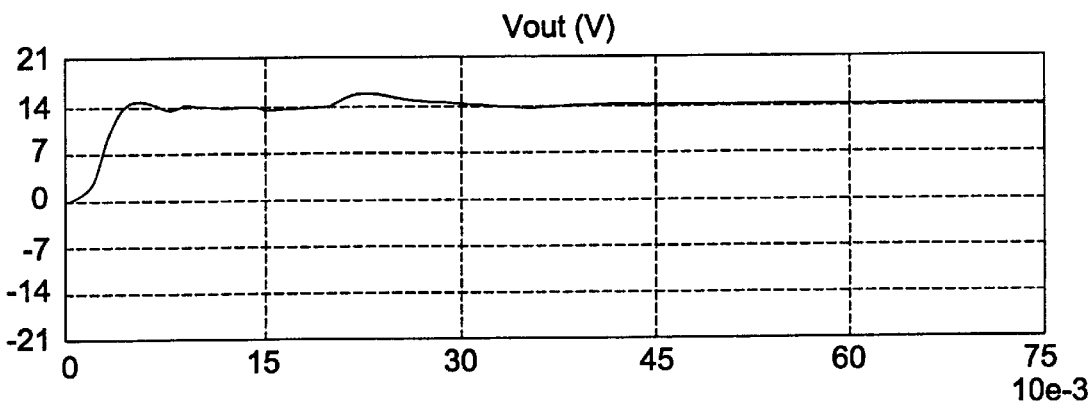
Figure 7C:
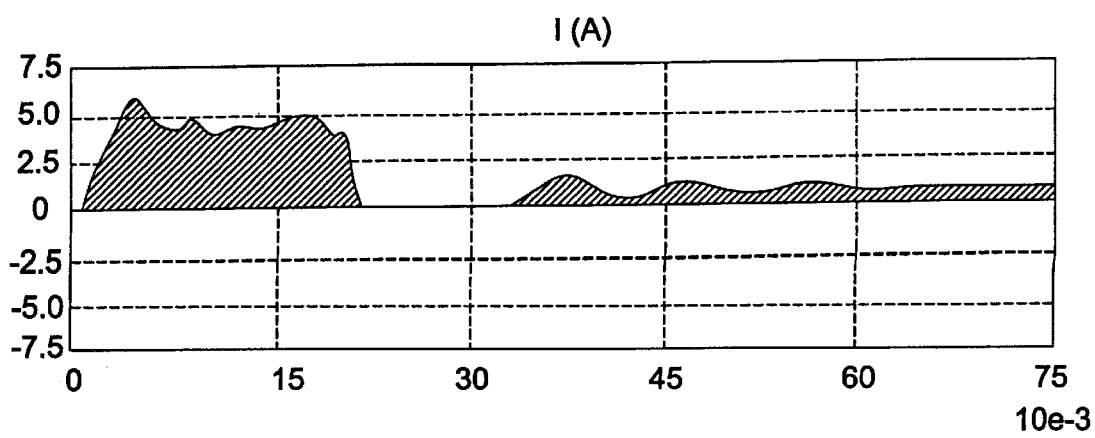
Figure 8A:
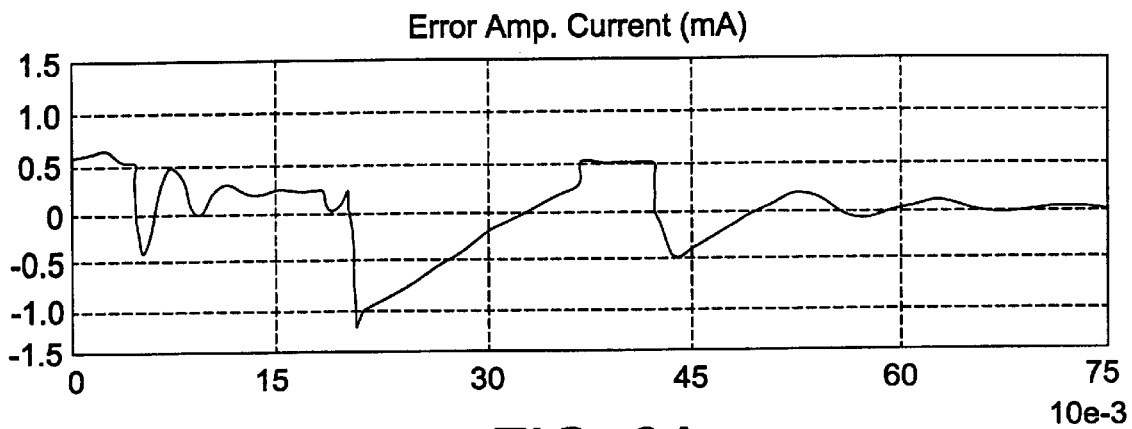
Figure 8B:
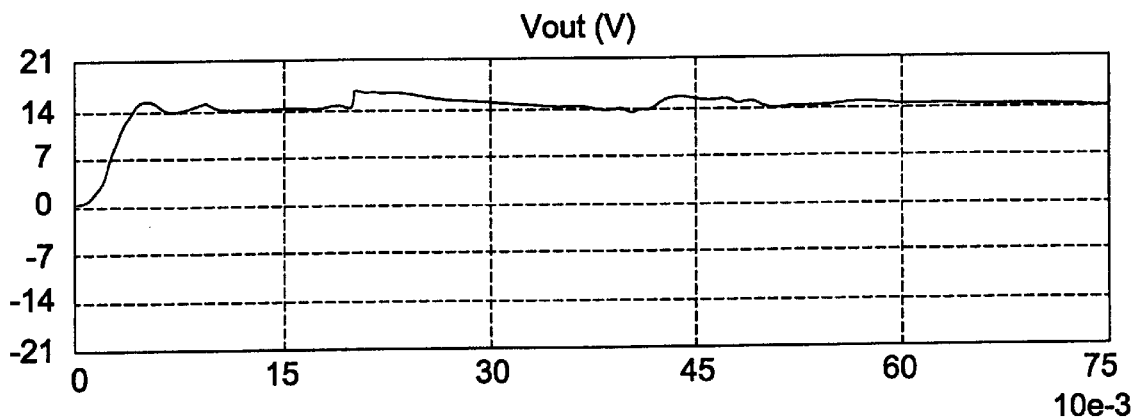
Figure 8C:
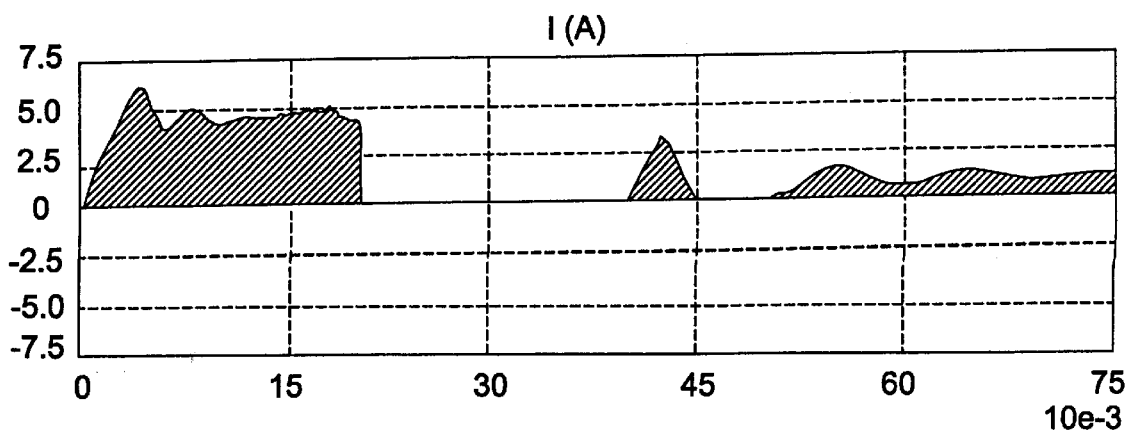

The invention has been tested and simulated on a functional model in a SIMULINK environment. This has permitted the reproduction of the waveforms of the significant current and voltage signals, and a comparison between the behaviors of the converter with and without the modulator of the invention. FIG. 6 depicts the waveforms of the current output by the error amplifier of the output voltage and of the current through the power switch at start-up. This is with an applied load of about 40 W under the control of the primary loop of the flyback switching converter in FIG. 3. FIG. 3 initially introduced the energy transfer modulator circuit MODULATOR of the invention. For the same testing conditions, FIG. 7 shows the waveforms of the same signals without a modulator circuit of the invention. FIGS. 8 and 9 respectively show the waveforms of the same signals for a converter with and without the modulator circuit. These waveforms highlight the transient that occurs at start-up with a 200 W load, until about 20 ms, and upon a stepwise reduction of the load to about 4 W.

What is claimed is:

1. A method for controlling a flyback DC-DC converter comprising a transformer for storing and transferring energy to a load, the transformer including a primary winding, a secondary winding and an auxiliary winding having a voltage induced by current in the secondary winding, a power switch connected to the primary winding, an output filter capacitor, and a fixed frequency oscillator having a frequency lower than a self-oscillating frequency control mode of the converter for a start-up charge transient of the output filter capacitor, the flyback DC-DC converter operating in a fixed frequency control mode for a low load, the method comprising:

monitoring the auxiliary winding to regulate an amount of energy transferred for enabling the power switch driving the primary winding;

enabling the power switch for a new conduction and energy storage phase; and controlling the amount of energy transferred from the primary winding to the secondary winding by introducing a delay to a turn-on instant of the power switch with respect to a turn-on command generated during the self-oscillating frequency control mode and modulating the power switch off time as a function of an overshoot of an output voltage on the secondary winding during both the fixed frequency control mode and the self-oscillating frequency control mode.

2. A method according to claim 1, wherein the step of controlling is responsive to sensing a zero crossing of the voltage in the auxiliary winding during the fixed frequency control mode, and upon sensing a rising edge of a signal generated by the oscillator as a function of input variables of a primary and a secondary control loop, independent of the control mode of the flyback DC-DC converter.

3. A method according to claim 1, wherein the step of monitoring comprises using a primary control loop.

4. A method according to claim 1, wherein the step of monitoring comprises detecting a zero-crossing of the voltage on the auxiliary winding.

5. A method according to claim 1, wherein a duration for the step of monitoring is established by a secondary control loop.

6. A method according to claim 1, wherein a duration for the step of monitoring is based upon the output voltage on the secondary winding for disabling the power switch for a new off phase.

7. A method for controlling a flyback DC-DC converter comprising:

monitoring an auxiliary winding of a transformer to regulate an amount of energy transferred from a primary winding to a secondary winding for enabling a power switch driving the primary winding;

enabling the power switch for a new conduction and energy storage phase; and controlling the amount of energy transferred from the primary winding to the secondary winding by introducing a delay to a turn-on instant of the power switch with respect to a turn-on command generated during a self-oscillating frequency control mode and modulating the power switch off time as a function of an overshoot of an output voltage on the secondary winding.

8. A method according to claim 7, wherein the step of controlling is responsive upon sensing a zero crossing of a voltage on the auxiliary winding during a fixed frequency control mode, and upon sensing a rising edge of a signal generated by an oscillator as a function of input variables of a primary and a secondary control loop, independent of the control mode of the flyback DC-DC converter.

9. A method according to claim 7, wherein the step of monitoring comprises using a primary control loop for detecting a zero-crossing of the voltage induced on the auxiliary winding.

10. A method according to claim 7, wherein a duration for the step of monitoring is established by a secondary control loop using the output voltage on the secondary winding for disabling the power switch for a new off phase.

11. A DC-DC flyback converter comprising:

a transformer including a primary, secondary and an auxiliary winding;

a control circuit comprising a supply capacitor being charged by the auxiliary winding;

a hysteresis circuit for enabling said control circuit when a voltage on said supply capacitor exceeds a certain threshold;

a power switch for driving the primary winding;

a primary control loop for enabling said power switch comprising
a driver stage connected to said power switch,
a first error amplifier having a first input receiving the voltage across said supply capacitor, and a second input receiving a first reference voltage,
a first comparator for comparing a voltage proportional to current flowing through said power switch with an output voltage from said first error amplifier, and
a bistable circuit connected to said first comparator for controlling said driver stage;

a secondary control loop connected to the secondary winding comprising
a second error amplifier having a first input receiving an output voltage across the secondary winding, and a second input receiving a second voltage reference,
a photocoupler means for connecting an output of said second error amplifier to an input of said first comparator,
a fixed frequency oscillator having a frequency lower than a frequency of the DC-DC converter self-oscillating under steady state conditions,
an enabling circuit connected between said photocoupler means and said fixed frequency oscillator for enabling said fixed frequency oscillator,
a second comparator having an input connected to the auxiliary winding to detect a zero crossing of a voltage induced on the auxiliary winding by current flowing in the secondary winding,
first and second logic circuits establishing priority of a set signal input to said bistable circuit over a signal output by said first comparator, and over a signal output by said first logic circuit having inputs receiving signals output by said second comparator and by said fixed frequency oscillator; and a modulator circuit connected between an output of said bistable circuit and an input of said driver stage for introducing a delay on a turn-on instant of said power switch with respect to a turn-on command output by said bistable circuit responsive to an enabling signal generated by said enabling circuit, and an input signal of said first error amplifier, and a voltage across said photocoupler.

12. A DC-DC converter according to claim 11, wherein said modulator circuit comprises:

a third comparator for comparing a voltage at an input of said first error amplifier with the first reference voltage;

a fourth comparator for comparing an error voltage at an output of said first error amplifier with the first reference voltage;

a ramp generator activated by the turn-on command provided at an output of said bistable circuit;

a fifth comparator for comparing an output of said third comparator with an output of said ramp generator;

a sixth comparator for comparing an output of said fourth comparator with the output of said ramp generator; and an output bistable circuit connected to said fifth and sixth comparators, and an output coupled to an input of said driver stage.

13. A DC-DC converter according to claim 12, wherein said modulator circuit further comprises:

a first inverter connected to an output of said enabling circuit for inverting the enabling signal;

a first logic gate having first and second inputs coupled to the outputs of said fifth and sixth comparators, and a third input coupled to an output of said first inverter;

a second logic gate having a first input connected to an output of said first logic gate, and a second input connected to an output of said bistable circuit; and a second inverter connected to an output of said second logic gate;

wherein said output bistable circuit has a set input coupled to an output of said second logic gate, and a reset input connected to an output of said inverter.

14. A DC-DC converter according to claim 13, wherein said first logic gate comprises an OR gate.

15. A DC-DC converter according to claim 13, wherein said second logic gate comprises an AND gate.

16. A DC-DC flyback converter comprising:

a transformer including a primary, a secondary and an auxiliary winding;

a control circuit comprising a supply capacitor being charged by the auxiliary winding;

a power switch for driving the primary winding;

a primary control loop for controlling said power switch;

a secondary control loop connected to the secondary winding for controlling an output voltage to the load; and a modulator circuit connected to said first and second control loops for introducing a delay on a turn-on instant of said power switch with respect to a turn-on command generated by said first and second control loops and for modulating the off time of said power switch as a function of an overshoot of the output voltage.

17. A DC-DC converter according to claim 16, further comprising a hysteresis circuit for enabling said control circuit when a voltage on said supply capacitor exceeds a certain threshold.

18. A DC-DC converter according to claim 16, wherein said primary control loop comprises:

a driver stage connected to said power switch;

a first error amplifier having a first input receiving the voltage across said supply capacitor, and a second input receiving a first reference voltage;

a first comparator for comparing a voltage proportional to current flowing through said power switch with an output voltage from said first error amplifier; and a bistable circuit connected to said first comparator for controlling said driver stage.

19. A DC-DC converter according to claim 18, wherein said secondary control loop comprises:

a second error amplifier having a first input receiving an output voltage across the secondary winding, and a second input receiving a second voltage reference;

a photocoupler for connecting an output of said second error amplifier to an input of said first comparator;

a fixed frequency oscillator having a frequency lower than a frequency of the DC-DC converter self-oscillating under steady state conditions;

an enabling circuit connected between said photocoupler and said fixed frequency oscillator for enabling said fixed frequency oscillator; and a second comparator having an input connected to the auxiliary winding for detecting a zero crossing of a voltage induced on the auxiliary winding by current flowing in the secondary winding.

20. A DC-DC converter according to claim 19, wherein said primary and secondary control loops further comprise first and second logic circuits establishing priority of a set signal input to said bistable circuit over a signal output by said first comparator, and over a signal output by said first logic circuit having inputs receiving signals output by said second comparator and by said fixed frequency oscillator.

21. A DC-DC converter according to claim 20, wherein said modulator circuit is connected between an output of said bistable circuit and an input of said driver stage.

22. A DC-DC converter according to claim 18, wherein said modulator circuit introduces the turn-on delay of said power switch responsive to an enabling signal generated by said enabling circuit, and an input signal of said first error amplifier and a voltage across said photocoupler.

23. A DC-DC converter according to claim 18, wherein said modulator circuit comprises:

a third comparator for comparing a voltage at an input of said first error amplifier with the first reference voltage;

a fourth comparator for comparing an error voltage at an output of said first error amplifier with the first reference voltage;

a ramp generator activated by a turn-on command provided at an output of said bistable circuit;

a fifth comparator for comparing an output of said third comparator with an output of said ramp generator;

a sixth comparator for comparing an output of said fourth comparator with the output of said ramp generator; and an output bistable circuit connected to said fifth and sixth comparators, and output coupled to an input of said driver stage.

24. A DC-DC converter according to claim 23, wherein said modulator circuit further comprises:

a first inverter connected to an output of said enabling circuit, for inverting the enabling signal;

a first logic gate having first and second inputs coupled to the outputs of said fifth and sixth comparators, and a third input coupled to said first inverter;

a second logic gate having a first input connected to an output of said first logic gate, and a second input connected to an output of said bistable circuit; and a second inverter connected to an output of said second logic gate;

wherein said output bistable circuit has a set input coupled to an output of said second logic gate, and a reset input connected to an output of said second inverter.

25. A DC-DC converter according to claim 24, wherein said first logic gate comprises an OR gate.

26. A DC-DC converter according to claim 24, wherein said second logic gate comprises an AND gate.

27. A method according to claim 7, wherein the flyback DC-DC converter operates in a fixed frequency control mode for a low load; and wherein the controlling comprises modulating the power switch off time during both the fixed frequency control mode and the self-oscillating frequency control mode.

28. A method according to claim 16, wherein the DC-DC flyback converter operates in a self-oscillating frequency control mode under a load and in a fixed frequency control mode for a low load; and wherein the modulator circuit modulates the off time of said power switch during both the fixed frequency control mode and the self-oscillating frequency control mode.

29. A DC-DC flyback converter comprising:

a transformer including a primary, a secondary and an auxiliary winding;

a control circuit comprising a supply capacitor being charged by the auxiliary winding;

a hysteresis circuit for enabling said control circuit when a voltage on said supply capacitor exceeds a certain threshold;

a power switch for driving the primary winding;

a primary control loop for controlling said power switch;

a secondary control loop connected to the secondary winding for controlling an output voltage to the load; and a modulator circuit connected to said first and second control loops for introducing a delay on a turn-on instant of said power switch with respect to a turn-on command generated by said first and second control loops.

30. A DC-DC converter according to claim 29, wherein said primary control loop comprises:

a driver stage connected to said power switch;

a first error amplifier having a first input receiving the voltage across said supply capacitor, and a second input receiving a first reference voltage;

a first comparator for comparing a voltage proportional to current flowing through said power switch with an output voltage from said first error amplifier; and a bistable circuit connected to said first comparator for controlling said driver stage.

31. A DC-DC converter according to claim 30, wherein said secondary control loop comprises:

a second error amplifier having a first input receiving an output voltage across the secondary winding, and a second input receiving a second voltage reference;

a photocoupler for connecting an output of said second error amplifier to an input of said first comparator;

a fixed frequency oscillator having a frequency lower than a frequency of the DC-DC converter self-oscillating under steady state conditions;

an enabling circuit connected between said photocoupler and said fixed frequency oscillator for enabling said fixed frequency oscillator; and a second comparator having an input connected to the auxiliary winding for detecting a zero crossing of a voltage induced on the auxiliary winding by current flowing in the secondary winding.

* * * * *

UNITED STATES PATENT AND TRADEMARK OFFICE
CERTIFICATE OF CORRECTION

PATENT NO. : 6,118,675  Page 1 of 1
DATED : September 12, 2000
INVENTOR(S) : Antonio Lionetto, Luigi Occhipinti, Sergio Tommaso Spaminato, Riccardo Caponetto It is certified that error appears in the above-identified patent and that said Letters Patent is hereby corrected as shown below:

Drawings, Fig. 3 Insert

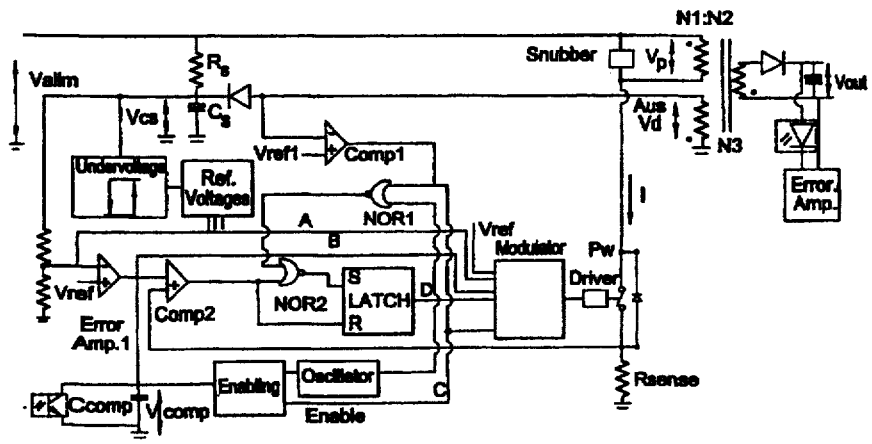

FIG. 3.

Column 8,
Line 47, Insert --.-- after the word "transient"

Signed and Sealed this

Fourteenth Day of August, 2001

Attest:

NICHOLAS P. GODICI
Attesting Officer   Acting Director of the United States Patent and Trademark Office